April 5, 1949.  W. R. BISHOP  2,466,569
MACHINE FOR SIMULTANEOUSLY APPLYING A PLURALITY
OF TIRES ON A PLURALITY OF WHEELS
Filed Aug. 11, 1945  5 Sheets-Sheet 1

Fig. 1.

Inventor
William R. Bishop
By Cameron Kerkam + Sutton
Attorneys

April 5, 1949.  W. R. BISHOP  2,466,569
MACHINE FOR SIMULTANEOUSLY APPLYING A PLURALITY
OF TIRES ON A PLURALITY OF WHEELS
Filed Aug. 11, 1945　　　　　　　　　　　　5 Sheets-Sheet 4

William R. Bishop
By Cameron Kirkam & Sutton
Attorneys

Patented Apr. 5, 1949

2,466,569

UNITED STATES PATENT OFFICE 2,466,569

MACHINE FOR SIMULTANEOUSLY APPLYING A PLURALITY OF TIRES ON A PLURALITY OF WHEELS

William R. Bishop, Richmond, Ind., assignor to The F. & N. Lawn Mower Company, Richmond, Ind., a corporation of Delaware Application August 11, 1945, Serial No. 610,287

21 Claims. (Cl. 157—1.1)

This invention relates to wheelwright machines and more particularly to machines for applying rubber tires on wheels of lawn mowers or other wheeled structures.

An object of the invention is to provide a machine which will simultaneously apply a plurality of rubber tires on a plurality of wheels.

Another object of the invention is to provide a machine which will support a wheeled structure and simultaneously apply rubber tires on the wheels thereof, without straining, marring or scratching the structure or damaging the tires.

Another object of the invention is to provide a machine which will stretch a plurality of rubber tires and position them over a plurality of wheels for simultaneous application thereto upon release and contraction of the tires.

Another object of the invention is to provide a machine which will support a lawn mower and simultaneously apply rubber tires on the two wheels of the mower.

Another object of the invention is to provide a machine which will support, stretch, position and release a plurality of rubber tires for application thereof simultaneously upon a plurality of wheels over which the tires have been moved in the stretched condition.

Another object of the invention is to provide a machine which will support a lawn mower and hold, stretch, position and release rubber tires for application thereof to both mower wheels simultaneously upon a release and contraction of the tires.

These and other objects of the invention will appear from the following description and by reference to the accompanying drawings in which.

Figure 1:
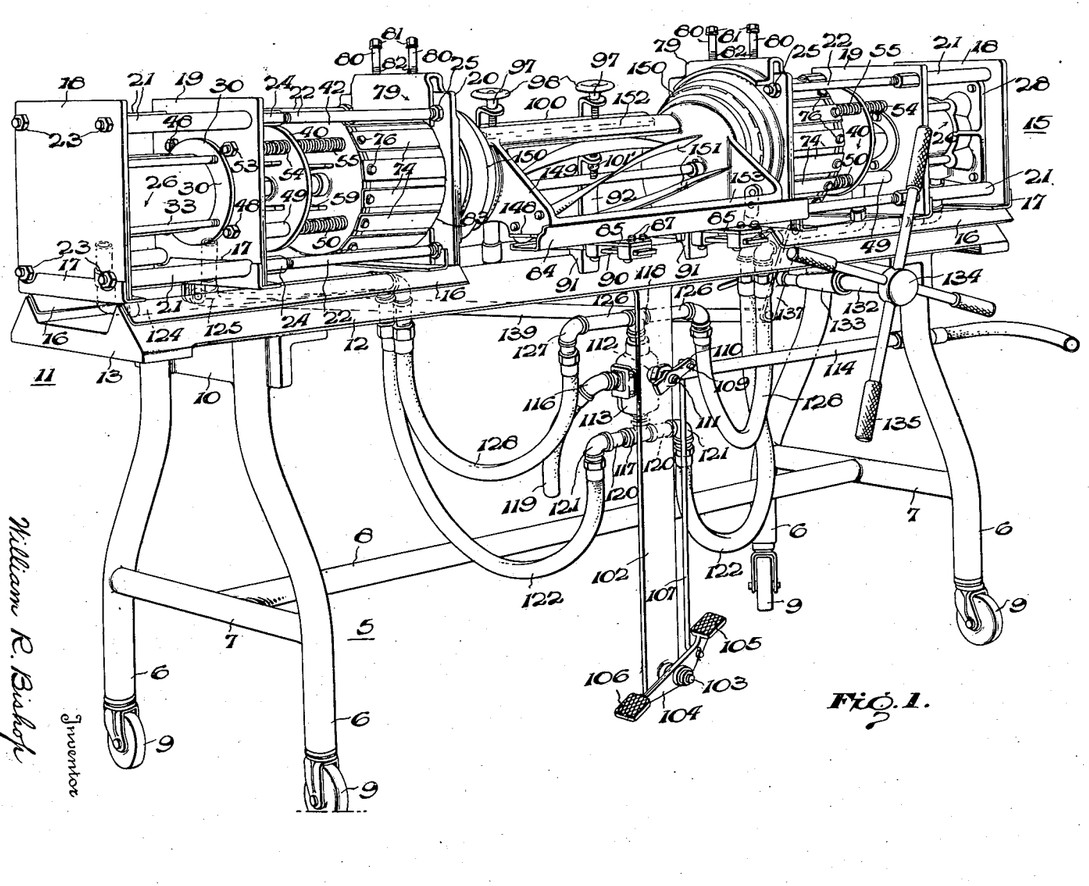
Fig. 1 is a perspective view of a machine embodying the invention and having means for supporting a lawn mower and applying rubber tires simultaneously to the wheels of the mower.
Figure 2:
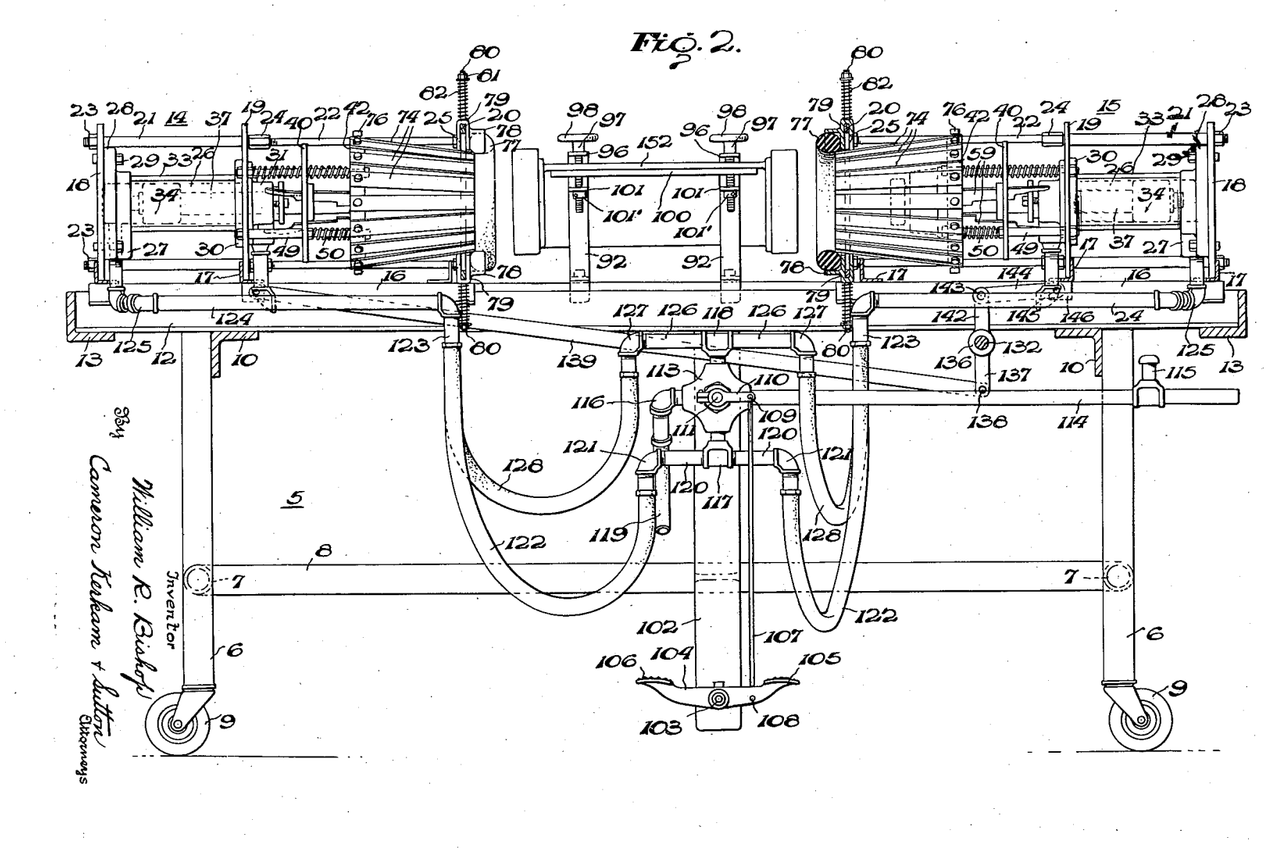
Fig. 2 is a vertical longitudinal section view of the machine shown in Fig. 1.
Figure 3:
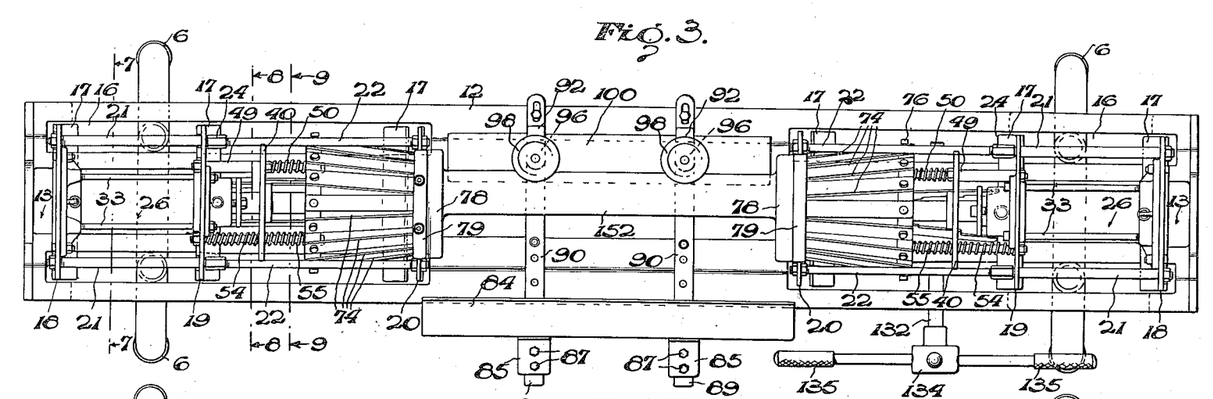
Fig. 3 is a top plan view thereof.

Referring to the drawings, wherein like reference characters indicate like parts throughout the several views, 5 indicates broadly the frame of the machine, Figs. 1 and 2, and 6 indicates legs of the frame at opposite ends thereof. Legs 6 are connected by cross braces 7 which, in turn, are connected by a longitudinal brace 8. Fitted in the lower ends of legs 6 are casters 9 which enable the frame 5 and parts mounted thereon to be readily moved about from place to place as desired. Secured to the upper ends of legs 6 are cross supports 10 for a bed 11 comprised by rails 12 which are secured to the cross supports 10. Rails 12 are connected together at their opposite extremities by end pieces 13 of the bed 11.

Mounted on the bed 11 for movement therealong toward and away from each other are carriages 14 and 15 of like construction having runners 16 engaged with and slidable along the rails 12. Runners 16 are connected by cross supports 17 for spaced vertical plates 18, 19 and 20 each bolted or otherwise suitably secured to one of the cross supports 17. Plates 18, 19, 20 are connected by the rods 21 shouldered to bear against plates 18, 19 and having reduced portions 22 for connection with plates 20. Nuts 23 clamp plates 18 on outer reduced ends of rods 21. Nuts 24 clamp plates 19 against the inner shouldered portions of rods 21. Nuts 25 clamp plates 20 on the inner ends of the reduced portions 22 of rods 21.

Carriages 14, 15 have mounted thereon for movement therewith rubber tire stretching and applying mechanisms of like construction. Like parts of both of these mechanisms are indicated by the same reference characters and, since the two mechanisms are identical, it is only necessary to describe one of them in detail. Thus, the rubber tire stretching and applying mechanism on carriage 14, for example, includes a cylinder 26 arranged between plates 18 and 19 and projecting through a suitable opening in the latter. Cylinder 26 has a boss 27 formed integrally with a base 28 secured to plate 18 by bolts 29, Figs. 2, 5 and 6. A flange 30 on cylinder 26 bears against the outer side of plate 19. A head 31, having a flange 32, is secured on cylinder 26 by bolts 33. These bolts 33 are anchored in cylinder base 28 and project through suitable openings in flange 32, plate 19 and flange 30.

A piston 34 in cylinder 26 is secured at 35 on the reduced inner end 36 of a piston rod 37. The piston rod 37 projects outwardly through a suitable opening in cylinder head 31, and is provided with a packing gland 38 secured in any suitable manner to cylinder head 31. Exteriorly of cylinder 26, piston rod 37 is provided with an abutment 39. A substantially stationary cam plate 40, having trip finger camming slots 41 therein, is loosely mounted on piston rod 37 between abutment 39 and cylinder head 31. A head 42, movable inwardly and outwardly of the machine and having trip finger receiving slots 43, is loosely mounted on piston rod 37 between a spider 44 and the abutment 39. The spider 44 is positioned on a reduced, threaded end 45 of piston rod 37. A nut 46 is threaded on reduced piston rod end 45 and holds spider 44 in position thereon.

A pair of guide rods 47, Figs. 1, 2, 3, 7, 8, 9 and 11, are provided for cam plate 40 and head 42. Rods 47 have outer reduced threaded ends which project outwardly through suitable openings in plate 19. Rods 47 are anchored upon plate 19 by nuts 48 threaded upon the outer reduced ends of said rods and bearing against the outer face of said plate. Rods 47 project through suitable openings in cam plate 40. Sleeves 49 are mounted on rods 47 between plate 19 and cam plate 40 to space them apart. Rods 47 project inwardly of head 42 through suitable openings therein. Springs 50 are mounted on rods 47 between cam plate 40 and head 42. Nuts 51 are threaded on the inner ends of rods 47 and limit inward movement of head 42.

Another pair of guide rods 52 are provided for cam plate 40 and head 42. Rods 52 have outer reduced threaded ends which project through suitable openings in plate 19, Fig. 10. Rods 47 and 52 are arranged in alternate relation, and rods 52 are anchored upon plate 19 by nuts 53 threaded upon the outer reduced ends of said rods 52 and bearing against the outer face of said plate. Rods 52 project through suitable openings in cam plate 40 and head 42. Springs 54 are mounted on rods 52 between plate 19 and cam plate 40. Springs 55 are mounted on rods 52 between cam plate 40 and head 42. Nuts 56 are threaded upon the inner ends of rods 52 and also limit inward movement of head 42. Springs 50 and 55 expand when head 42 is moved inwardly, and are compressed when head 42 moves outwarldy. Springs 50 and 55 prevent appreciable inward movement of cam plate 40, and spring 54 provide for slight yielding outward movement of said cam plate into engagement with the inner ends of sleeves 49.

The spider 44 has short arms 57 projecting radially thereof. Pivoted at 58 upon arms 57 are trip fingers 59 which project outwardly through the trip finger receiving slots 43 of head 42. Fingers 59 are alined with, and upon outward movement of piston rod 37 project through, the finger camming slots 41 of cam plate 40. Surrounding fingers 59 and tending to draw them inwardly toward spider 44 is an endless, circular coil spring 60. This coil spring 60 is positioned in semicircular recesses 99 formed in the outer edges of fingers 59. Longitudinally spaced latch teeth 61 and 62 are formed on the inner edges of fingers 59. Cams 63 are formed on the inner edges of fingers 59 near their free ends 64.

A small spider 65 comprised by parts 66 and 67 is mounted on the reduced end 45 of piston rod 37. Part 67 is recessed to receive a nut 68 threaded upon the reduced piston rod end 45. Nut 68 thus clamps the spider 65 against the nut 46. Spider parts 66, 67 have short arms 69 on which are pivoted, as at 70, corresponding ends of toggle links 71. The opposite ends of links 71 are pivotally connected, as at 72, with lugs 73 formed on a substantially circular series of rubber tire stretching and applying fingers 74. The lugs 73 project inwardly from the free inner end portions of fingers 74, and the outer ends of said fingers are pivoted on head 42 to rock upon an arcuate surface 75 on the periphery of said head. For this purpose, the outer ends of fingers 74 have suitable openings through which loosely project the shanks of machine screws 76 threaded in suitable openings in the peripheral portion of head 42.

Figure 5:
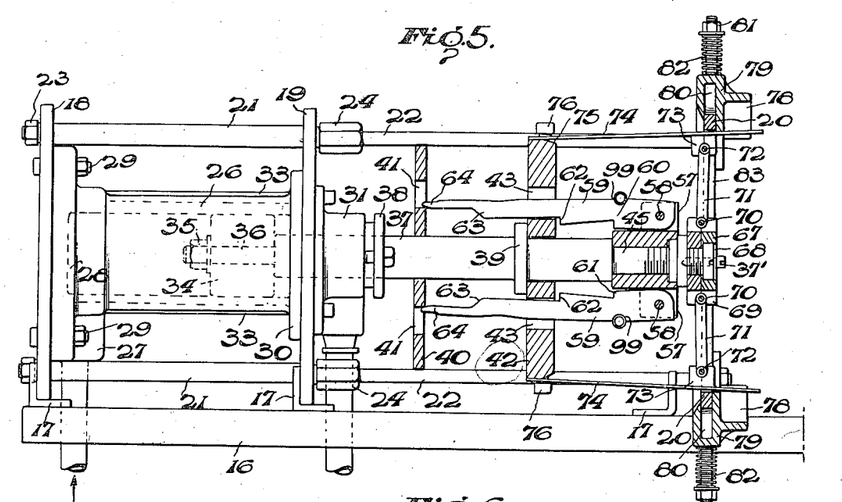
Figs. 5 and 6 are enlarged side views, partly in section, of the rubber tire stretching and applying means in tire stretching and tire releasing positions, respectively.
Figure 6:
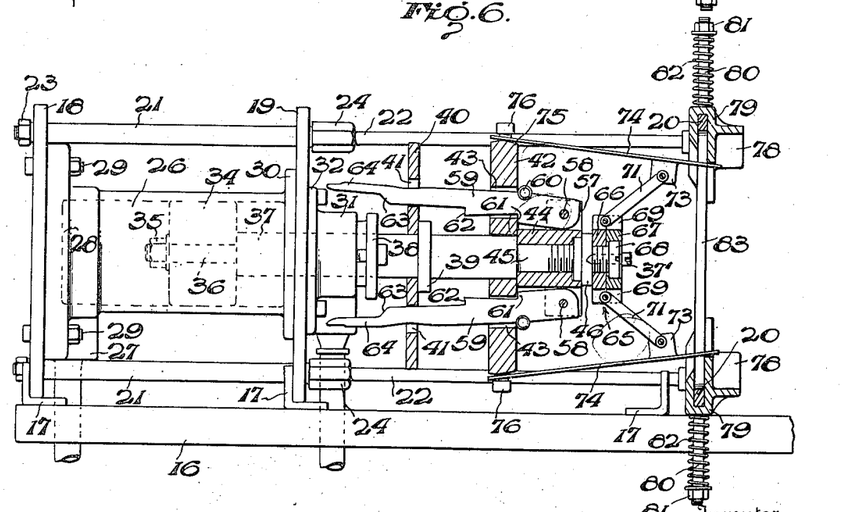
Figures 7, 8, 9, 10, 11, 12:
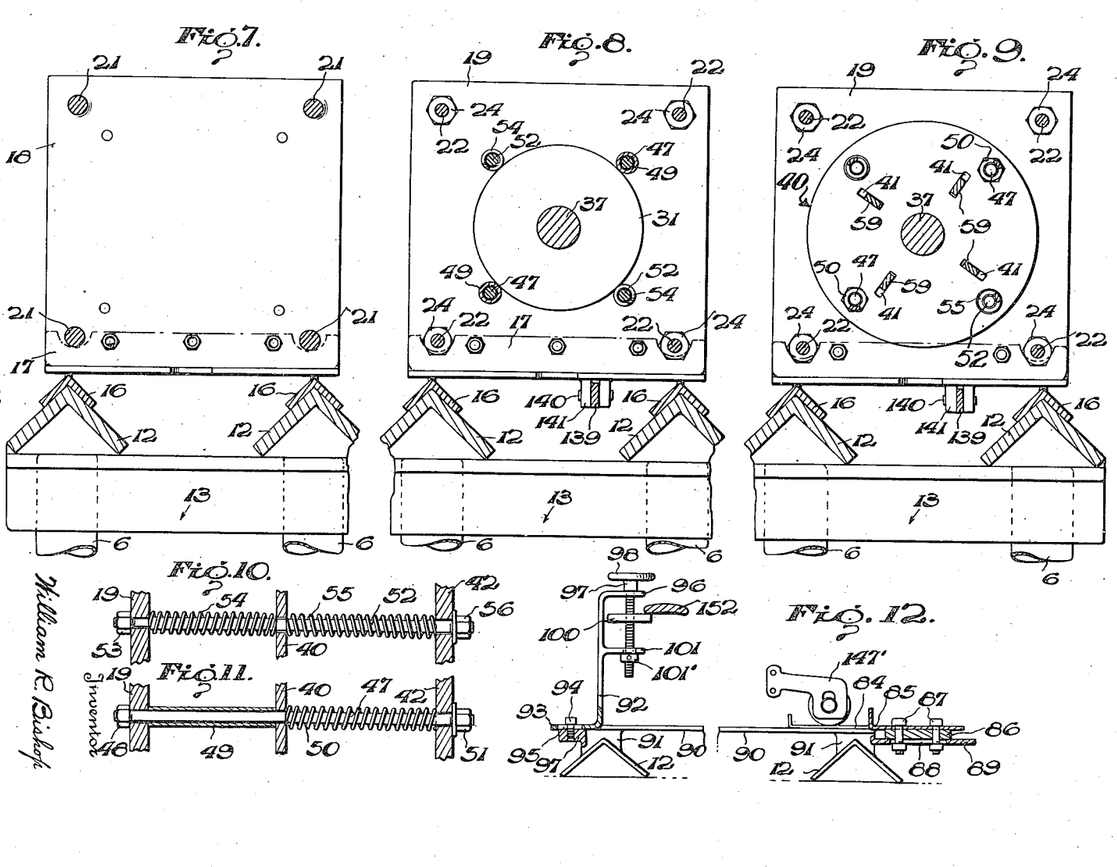
Figs. 7, 8 and 9 are enlarged transverse vertical sectional views on the lines 7—7, 8—8, 9—9, respectively, of Fig. 3.
Figs. 10 and 11 are enlarged detail views of guide rods and associated devices shown in Figs. 1, 2 and 3.
Fig. 12 is an enlarged end view of a lawn mower holder and associated devices shown in Figs. 1, 2 and 3.

The rubber tires 77, which may be of solid or tubular construction, are each placed in arcuate shaped tire gripping shoes or clamps 78, Figs. 5 and 6, formed on holders 79 slidably mounted upon plate 20 at the top and bottom thereof. Holders 79 have suitable openings for retainer bolts 80 the inner ends of which are threaded in suitable openings in the top and bottom of plate 20. Bolts 80 have nuts 81 threaded on their outer ends. Springs 82, mounted on bolts 80 between nuts 81 and holders 79, provide for yieldable sliding movement of the holders so that rubber tires of various sizes may be placed between, gripped and held in position by shoes 78. Plate 20 has a large opening 83 therein, Figs. 1, 2, 5 and 6, so that fingers 74 may be projected through said plate to engage, stretch and release tires 77 as later described.

A lawn mower holder 84, Figs. 1, 2, 3 and 12, is mounted on the bed 11 of the machine between the carriages 14 and 15. This holder 84 has feet 85 projecting therefrom toward the front of the machine. Arranged below the feet 85 of holder 84 are blocks 86 through suitable openings in which project bolts 87. The bolts 87 also project through slots 88 formed lengthwise in the arms 89 of guides 90 arranged transversely of the bed 11 of the machine. Bolts 87 and the slots 88 in arms 89 enable the lawn mower holder 84 to be adjusted transversely of bed 11 and held in various positions to accommodate lawn mowers of various sizes. Guides 90 have secured thereto or formed integrally therewith blocks 91 slidably fitted on the rails 12 so that the lawn mower holder 84 may be moved along said rails to properly position said holder between carriages 14 and 15.

Lawn mower holding brackets 92 have feet 93 resting on the rear ends of guides 90. Bolts 94 project through slots 95 formed in feet 93 lengthwise thereof. These bolts 94 are threaded in suitable openings in the rear ends of guides 90. Brackets 92, through the described connections therefor with guides 90, also may be adjusted transversely of the bed 11 of the machine and held in various positions to accommodate lawn mowers of various sizes. Brackets 92 are provided at their upper ends with arms 96 having suitable openings for screws 97. Small hand operated wheels 98 are fixed on the upper ends of screws 97. The screws 97 project downwardly through and have threaded engagement with the walls of suitable openings formed in a rest 100 which may be raised and lowered by said screws. Brackets 92 are provided with lugs 101, and screws 97 project loosely through suitable openings in said lugs downwardly below the same. Collars 101' secured on screws 97 below lugs 101 prevent vertical displacement of said screws.

Figure 4:
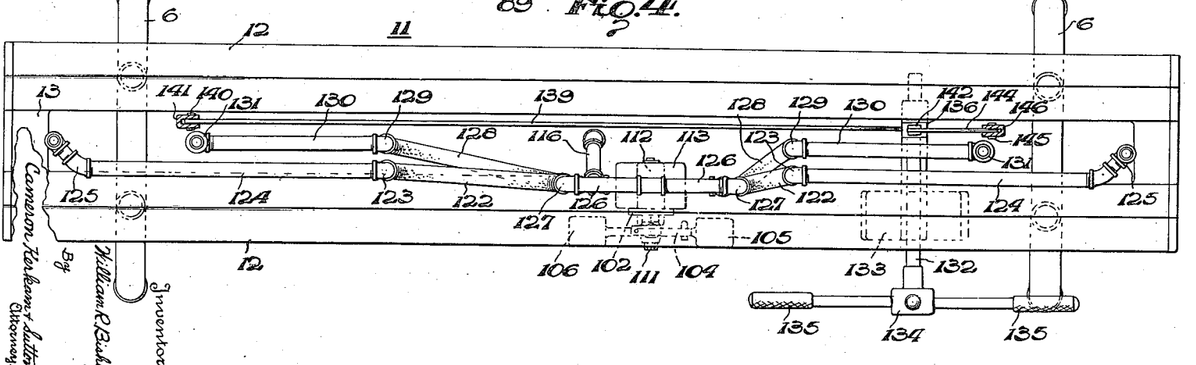
Fig. 4 is a schematic top plan view of connections for supplying compressed air to and operating rubber tire stretching and applying means shown in Figs. 1, 2 and 3.

A standard 102, Figs. 1, 2 and 4, has its upper end welded or otherwise suitably secured to the rail 12 which extends along the machine at the front thereof. Standard 102 has pivoted on its lower end, as at 103, a double arm lever 104 provided at its opposite ends, respectively, with foot treadles 105 and 106. A link 107 has its lower end pivotally connected, as at 108, with the lever 104 at a point between its pivot 103 and the treadle 105. The upper end of link 107 is pivotally connected, as at 109, with an arm 110 fixed on the stem 111 of a valve 112. This valve 112 is arranged for operation in a housing 113 bolted or otherwise suitably secured on the standard 102 near its upper end and at the rear thereof. The valve housing 113 is connected by a pipe 114 with any suitable source of air under pressure, when the machine has been wheeled to its place of operation. A valve 115 in pipe 114 serves to control the supply of compressed air through said pipe to the valve housing 113.

The valve 112 is one of well known construction, made by Hanna Engineering Works and, accordingly, a detail description of this valve is unnecessary. The valve 112 serves to direct compressed air selectively from housing 113 through pipe unions 116, 117 and 118 when said valve is operated by actuation of lever 104. Pipe unions 116, 117 and 118 are threaded in suitable openings in valve housing 113, and pipe union 116 has connected therewith an air exhaust pipe 119. Pipe union 117 is connected by pipes 120 and other unions 121 with corresponding ends of flexible conduits 122. The opposite ends of conduits 122 are connected with pipe unions 123 which are also connected with corresponding ends of pipes 124. The opposite ends of pipes 124 are connected with pipe unions 125 which, in turn, are threaded in suitable passages that are formed in the bosses 27 and lead into the outer ends of the cylinders 26. Pipe union 118 is connected by pipes 126 and other unions 127 with corresponding ends of flexible conduits 128. The opposite ends of conduits 128 are connected with pipe unions 129 which are also connected with the corresponding ends of pipes 130. The opposite ends of pipes 130 are connected with pipe unions 131 which, in turn, are threaded in suitable passages that are formed in the cylinder heads 31 and lead into the inner ends of the cylinders 26.

A carriage moving shaft 132, Figs. 1, 2, 3 and 4, is located at the right of the machine and projects transversely of and below the bed 11. Shaft 132 is journalled in a bearing 133 secured in any suitable manner to the rail 12 which extends along the machine at the front thereof. A hub 134 provided with handles 135 is fixed on the forward end of shaft 132 to operate it. A double arm lever 136 is fixed on the rear end of shaft 132 in any suitable manner. One arm 137 of lever 136 is pivotally connected, as at 138, with one end of a long link 139. The opposite end of link 139 is pivotally connected, as at 140, with a clevis 141, Figs. 2, 4, 8 and 9, welded or secured in any other suitable manner to the carriage 14 upon one of the cross supports 17 thereof. The other arm 142 of lever 136 is pivotally connected, as at 143, with one end of a short link 144. The opposite end of link 144 is pivotally connected, as at 145, with a clevis 146, Figs. 2 and 4, welded or secured in any other suitable manner to the carriage 15 upon one of the cross supports 17 thereof.

Referring now to operation of the machine, rubber tires 77 are placed and clamped in the shoes 78 of tire holders 79, as previously described. A lawn mower 147, Fig. 1, is placed upon holder 84 so that the mower's roller arms 147', Fig. 12, rest on said holder. Mower 147 includes the usual side frames 149, wheels 150, reel 151, top cross bar 152 connecting side frames 151, and bottom cross bar 153 connecting said side frames and carrying the cutter bar 148. Holder 84 and brackets 92 are adjusted and clamped upon guides 90 to properly position the mower 147 and the wheels 150 so that their axis of rotation may be brought into alinement with the longitudinal axis of each of the piston rods 37. The top cross bar 152 of the mower is supported on the rest 100. Hand wheels 98 are rotated to operate screws 97 and move rest 100 and the mower cross bar 152 vertically until the axis of rotation of the mower wheels 150 is brought into alinement with the longitudinal axis of each of the piston rods 37.

The pipe 114 having been connected with the source of air under pressure, treadle 105 is depressed to lower link 107 and arm 110 so that valve 112 is rotated clockwise and connects pipe 114 with pipes 122, 124 through the valve housing 113. Compressed air is thus admitted to the outer ends of cylinders 26 to move pistons 34 and piston rods 37 inwardly of the machine. Heads 42 and spiders 44, 65 move inwardly with piston rods 37. Inward movement of heads 42 results from expansion of springs 50, 55 and is limited by engagement of said heads with the nuts 51, 56 on the inner ends of the stationary guide rods 47, 52. When heads 42 move inward, the fingers 74 move inward and their free inner ends are projected within the tires on holders 79 through the large openings 83 in plates 20. At this time, inward movement of heads 42 ceases and spiders 44, 65 continue to move inward.

With further inward movement of heads 42 prevented, continued inward movement of spiders 65 straightens out the toggle connections 71 between said spiders and the fingers 74. Straightening out of the aforesaid toggle connections spreads the fingers 74 outwardly with a swinging movement thereof about their pivots 75, 76 on the heads 42. When fingers 74 are thus spread outwardly, their free inner ends engage the tires 77 and stretch them beyond their normal size so that they may be applied upon the mower wheels 150 as will presently be described. When the tires 77 are being stretched by the fingers 74, the holders 79 will slide along the tops and bottoms of plates 20 and compress the springs 82.

With inward movement of heads 42 discontinued, spiders 44 on further inward movement thereof will draw the trip fingers 59 inwardly through the slots 41 in cam plates 40 and the slots 43 in heads 42. When the cams 63 of fingers 59 pass inwardly through the cam plate slots 41, fingers 59 are retracted toward spiders 44 by springs 60, and the teeth 62 of said fingers are engaged with the inner faces of heads 42. Fingers 59 thus lock the straightened toggle connections 71 and insure that fingers 74 will remain in spread positions and hold tires 77 stretched until the proper time for application of said tires to the mower wheels 150. Inward movement of the pistons 34 and piston rods 37 ceases when the abutments 39 on said rods engage the heads 42.

During spreading of the fingers 74 and stretching of the tires 77, or afterwards as desired, the machine attendant while still keeping treadle 105 depressed, moves carriages 14, 15 inwardly along rails 12 by imparting counter-clockwise rotation to shaft 132 through the medium of the handles 135. In this connection, it will be remembered that the carriages 14, 15 are connected with shaft 132 by the lever arms 137, 142 and the links 139, 144 so, accordingly, inward movement of carriages 14, 15 along rails 12 will result from counter-clockwise rotation of shaft 132. During inward movement of carriages 14, 15, the inner slotted ends of hardened screws 37', adjustably secured and threaded in the inner ends of piston rods 37 in suitable openings therein, engage the mower wheels 150 at the centers thereof and shift the mower 147 along holder 84 and rest 100 to position the mower 147 centrally of the heads 42 so that the expanded tires 77 on the inner ends of the spread fingers 74 are thus positioned over the mower wheels 150. Inward movement of carriages 14, 15 will be discontinued when the expanded tires 77 have been carried inward to and are positioned over the mower wheels 150 by the holders 79 and said carriages. At this time, the machine attendant depresses treadle 106 to lift link 107 and arm 110 and turn valve 112 counter-clockwise in valve housing 113.

During counter-clockwise movement of valve 112, compressed air in the outer ends of cylinders 26 is exhausted to atmosphere through pipe 119, the valve 112, the valve housing 113 and the described connections for said housing with the outer ends of said cylinders. Upon completion of counter-clockwise movement of valve 112, the inner ends of cylinders 26 are connected with pipe 114 through the valve 112, the valve housing 113 and the described connections for said housing with the inner ends of said cylinders. Compressed air is thus admitted to the inner ends of cylinders 26 and moves pistons 34 and piston rods 37 outwardly of the machine. Spiders 44, 65 move outwardly with piston rods 37. Trip fingers 59 move outwardly with spiders 44. Heads 42, then being engaged on their inner faces by the teeth 62 of fingers 59, move outwardly along guide rods 47, 52.

Outward movement of heads 42 withdraws fingers 74 from the stretched tires 77 which then contract and snap into position on the mower wheels 150. In the meantime, through outward movement of spiders 44 with piston rods 37, trip fingers 59 move outwardly and the ends 64 and cams 63 of said fingers pass outwardly through the cam slots 41 in plate 40. This spreads the fingers 59 so that the teeth 62 pass outwardly through the slots 43 of heads 42 as outward movement of spiders 44, piston rods 37 and pistons 34 continues. Springs 54 cushion cam plates 40 when the ends 64 and cams 63 of fingers 59 enter cam slots 41. The teeth 62 of fingers 59 are disengaged from the inner faces of heads 42 when the cams 63 enter cam slots 41 and the fingers 59 are spread. Teeth 62, accordingly, pass outwardly through the slots 43 of heads 42 as fingers 59 move outwardly. When teeth 62 are disengaged from the front faces of heads 42, fingers 59 no longer impart outward movement to said heads 42 and the straightened toggle connections 71 are unlocked.

When the straightened toggle connections 71 are unlocked and fingers 59 no longer impart outward movement to heads 42, said toggle connections are retracted through continued outward movement of spiders 65 with piston rods 37. Retraction of toggle connections 71 retracts fingers 74, whereupon springs 82 expand and slide holders 79 toward each other on the tops and bottoms of plates 20. At this time, spiders 44 engage heads 42 and the inner faces of said heads are engaged by the teeth 61 of fingers 59. Outward movement of heads 42 having compressed the springs 50, 55, said springs are retained in compressed condition through locking of heads 42 by the teeth 61 of fingers 59. Outward movement of piston rods 37 is stopped by engagement of abutments 39 with cam plates 40 and engagement of said plates with the inner ends of the stationary sleeves 49.

When fingers 74 have been moved outwardly and disengaged from tires 77 the latter, as previously pointed out, contract and snap into position on mower wheels 150. At this time, or later as desired, the carriages 14, 15 are moved outwardly along the bed 11 of the machine by rotating shaft 132 clockwise through the medium of the handles 135. The heads 42 and fingers 74 having been moved outwardly and said fingers having been retracted, as described, treadle 106 is released whereupon said treadle, the treadle 105, the arm 104 and parts connected with said arm are returned to the positions thereof shown in Fig. 2. This may be accomplished by the machine attendant or automatically by suitable means when he releases treadle 106. In either case, valve 112 rotates to a neutral position and prevents delivery of compressed air to cylinders 26.

During rotation of valve 112 to its neutral position, compressed air in the inner ends of cylinders 26 is delivered to atmosphere through pipe 119, the valve 112, the valve housing 113 and the described connections for said valve housing with the inner ends of said cylinders. The tires 77 having been applied on mower wheels 150 and the carriages 14, 15 having been moved outwardly, as described, the lawn mower 147, which has merely been placed upon holder 84 and rest 100 without being secured thereto in any way, may then be removed from the machine and another placed therein for application thereby of tires to the mower wheels in the manner described.

While one embodiment of the invention is illustrated in the accompanying drawings and described in detail herein, it is to be expressly understood that the invention is not limited to said embodiment or otherwise than by the terms of the appended claims.

What is claimed is:

1. A wheelwright machine comprising means for supporting a structure having a plurality of wheels, a plurality of tire carrying mechanisms movable relatively to said supporting means to carry the tires to positions adjacent the wheels, a plurality of means associated with but movable relatively to said tire carrying mechanisms for applying the tires to the wheels, and means for effecting like movements of said tire carrying mechanisms and said tire applying means simultaneously so as to apply a plurality of tires to a plurality of wheels simultaneously.

2. A wheelwright machine comprising a plurality of tire holding, stretching and applying mechanisms, and means for successively imparting tire stretching and applying movements to said mechanisms whereby tires held by said mechanisms are applied on a plurality of wheels simultaneously.

3. A wheelwright machine comprising a plurality of tire holding, stretching and applying mechanisms, means for supporting a wheeled structure with the wheels thereof opposite said mechanisms, and means for successively imparting tire stretching and applying movements to said mechanisms whereby tires held by said mechanisms are applied on said wheels simultaneously.

4. A wheelwright machine comprising a plurality of movable carriages, a plurality of tire carrying mechanisms each mounted on and movable with one of the carriages, means for simultaneously moving the carriages and mechanisms to tire applying positions, a plurality of additional mechanisms mounted on said carriages but movable relatively thereto and to said tire carrying mechanisms for applying the tires to wheels, and means for simultaneously operating said tire applying mechanisms.

5. A wheelwright machine comprising a plurality of movable carriages, a plurality of tire carrying, stretching and applying mechanisms each mounted on one of said carriages, means for simultaneously imparting tire stretching movement to the mechanisms, means for simultaneously moving the carriages and mechanisms to tire applying positions for the latter, and means for simultaneously imparting tire applying movement to said mechanisms at said positions so that tires carried by and stretched on said mechanisms are applied thereby on a plurality of wheels simultaneously.

6. A wheelwright machine comprising a plurality of movable carriages, a plurality of tire carrying mechanisms each mounted on and movable with one of said carriages, operating means for simultaneously moving the carriages and tire carrying mechanisms to tire applying positions, a plurality of additional mechanisms mounted on said carriages but movable relatively thereto and to said tire carrying mechanisms for applying tires to wheels, fluid operated means on the carriages connected with said tire applying mechanisms and adapted to operate them simultaneously at said positions whereby they may apply said tires on a plurality of wheels simultaneously, and means for controlling operation of said fluid operated means.

7. A wheelwright machine comprising a plurality of tire carrying, stretching and applying mechanisms, means for simultaneously moving them toward and away from tire applying positions, operating means for imparting tire stretching movement to the mechanisms simultaneously and for imparting tire applying movement to said mechanisms simultaneously so that they may apply tires carried thereby on a plurality of wheels arranged at said positions, and means controlled by said operating means for locking the mechanisms in tire stretching position and for unlocking them to apply said tires.

8. A wheelwright machine comprising a bed upon which a lawn mower may be supported, a pair of carriages arranged on the bed for movement therealong toward and away from the wheels of said lawn mower, a pair of tire carrying, stretching and applying mechanisms each mounted on one of the carriages for movement therewith and adapted to carry a tire to one of the lawn mower wheels for application of the tire thereon, operating means for imparting tire stretching movement to said mechanisms simultaneously and for imparting tire applying movement thereto simultaneously, whereby said mechanisms may apply tires on said wheels simultaneously when the mechanisms and tires carried thereby have been moved toward the wheels with said carriages, and means controlled by said operating means for locking said mechanisms in tire stretching position and for unlocking them to apply said tires.

9. A wheelwright machine comprising a plurality of tire carrying, stretching and applying mechanisms movable toward and away from a plurality of wheels on a wheeled structure and adapted to carry tires to the wheels for application of the tires thereon, operating means for simultaneously imparting tire stretching movement to said mechanisms and for imparting tire applying movement thereto simultaneously, whereby said mechanisms may apply tires to said wheels simultaneously when the tires have been stretched by the mechanisms and moved thereby toward the wheels, and means controlled by said operating means for locking said mechanisms in the stretching position when moved toward the wheels and for unlocking said mechanisms to apply said tires to the wheels, said locking means comprising means to lock said mechanisms against the stretching and applying movement when moved away from said wheels.

10. A wheelwright machine comprising a plurality of tire stretching and applying mechanisms movable toward and away from a plurality of wheels on a wheeled structure, a plurality of tire carrying means to hold tires in position for application thereof on the wheels by the tire stretching and applying mechanisms, means for simultaneously moving said mechanisms toward and away from said wheels, and means for simultaneously imparting tire stretching movement to said mechanisms and for imparting tire applying movement thereto simultaneously, whereby said mechanisms may apply said tires to said wheels simultaneously when moved toward the same.

11. A wheelwright machine comprising a support provided therein with an opening, holders slidably mounted on the support adjacent the opening for engaging tread portions of a tire and holding the tire opposite the opening on one side thereof, tire stretching mechanism including members movable through said opening from the other side thereof to engage a tire in said holders and means for expanding said members so as to stretch the tire, means for holding a wheel opposite the opening in said support on the same side thereof as the tire, mechanism for producing relative movement between said support and said wheel holding means to position the wheel within the stretched tire, and means for contracting said tire engaging members and withdrawing the latter from engagement with the tire, whereby the tire may contract about the wheel.

12. A wheelwright machine comprising a head movable in opposite directions, an annular series of fingers pivoted on the head and movable therewith, means movable in one direction for spreading the fingers to stretch a tire thereon and movable in the opposite direction for retracting them to apply the tire on a wheel, one or more trip fingers arranged on and movable with the finger spreading and retracting means to lock the head and hold the tire stretching and applying fingers in spread position, said trip fingers being releasable from the head to provide for retraction of the tire stretching and applying fingers, and means for operating said trip fingers through movement of the same in opposite directions with said finger spreading and retracting means.

13. A wheelwright machine comprising a head movable in opposite directions, an annular series of tire stretching and applying fingers pivoted on the head and movable therewith, means movable in one direction for spreading the fingers to stretch a tire thereon and movable in the opposite direction for retracting them to apply the tire on a wheel, trip fingers engageable with the head to lock it and hold the tire stretching and applying fingers in spread position, said trip fingers being arranged on and movable with the finger spreading and retracting means and releasable from the head to provide for retraction of the tire stretching and applying fingers, and cam means having slots to receive the trip fingers and operate them through movement of the same in opposite directions with said finger spreading and retracting means.

14. A wheelwright machine comprising a fluid operated device, a head slidably mounted thereon for movement in opposite directions, an annular series of tire stretching and applying fingers pivoted on the head and movable therewith, means connecting the fingers with and operable by the fluid operated device for spreading the fingers to stretch a tire thereon and for retracting them to apply the tire on a wheel, guide rods for the head, means for operating the head including springs on the guide rods, trip fingers on the fluid operated device movable in opposite directions thereby and engageable with the head to lock it and hold the tire stretching and applying fingers in spread position, said trip fingers being releasable from the head to provide for retraction of the tire spreading and applying fingers, and a substantially stationary cam plate through openings of which the fluid operated device and guide rods project, said cam plate and head having slots through which the trip fingers may project, and said trip fingers being operated through movement of said fluid operated device and projection through the cam plate slots.

15. A wheelwright machine comprising a plurality of tire supporting members having openings therein and means to hold tires opposite the openings at one side thereof in vertically arranged positions to be applied on a plurality of vertically arranged wheels located on the same side of said openings as said tires, a plurality of mechanisms movable through said openings from the opposite sides thereof for engaging the tires held by said holding means and applying said tires on said wheels, and means for operating said mechanisms.

16. A wheelwright machine comprising a plurality of tire supporting members having openings therein and means to hold tires opposite the openings at one side thereof in vertically arranged positions to be applied on a plurality of vertically arranged wheels located on the same side of said openings as said tires, a plurality of laterally movable mechanisms operable through said openings from the opposite sides thereof to engage the tires held by said holding means, stretch the tires, and withdraw from the stretched tires for contraction thereof and application of the same on said wheels, and means for operating said mechanisms.

17. A wheelwright machine comprising a plurality of tire applying means arranged in spaced relation to one another and having devices to hold tires in positions for application thereof on wheels and other devices movable relatively to said first named devices and operable upon the tires held thereby for application thereof on said wheels, means for positioning a wheeled structure adjacent the tire applying means, and mechanism for moving one of said means relative to the other of said means whereby the wheels of said structure may have said tires applied thereon by said tire applying means.

18. A wheelwright machine comprising a plurality of tire applying means arranged in spaced relation to one another and having devices to releasably support tires for application thereof on wheels and other devices movable relatively to said first named devices and operable to stretch the supported tires and withdraw therefrom for application thereof on said wheels, means for positioning a wheeled structure adjacent the tire applying means, and mechanism for moving one of said means relative to the other of said means whereby the wheels of said structure may have said tires applied thereon by said tire applying means.

19. A wheelwright machine comprising means for positioning a wheel in a vertical plane, and tire applying means comprising means to carry a vertically arranged tire laterally to the wheel for application of the tire thereon and other means movable laterally with respect to said tire carrying means and operable upon the tire for application of said tire on said wheel.

20. A wheelwright machine comprising means for positioning a wheel in a vertical plane, tire applying means comprising a holder to support a tire in vertical position for application thereof on the wheel and devices movable with respect to said tire holder and operable upon the tire so held for application thereof on the wheel, and mechanism for moving one of said means laterally relatively to the other of said means so that said tire may be applied on said wheel by said tire applying means.

21. A wheelwright machine comprising tire applying mechanism including operating means movable in opposite directions, a head movable in opposite directions with and relative to the operating means, tire stretching fingers pivoted on the head and connected with the operating means for operation thereby, head and finger locking devices mounted on and movable with said operating means, and means for actuating the locking devices during movement thereof to lock or unlock said head and said fingers and thereby prevent or provide for movement of the same at predetermined intervals.

WILLIAM R. BISHOP.

REFERENCES CITED

The following references are of record in the file of this patent:

UNITED STATES PATENTS

| Number | Name | Date |
|---|---|---|
| 256,951 | Beasley | Apr. 25, 1882 |
| 625,409 | Neubecker | May 23, 1899 |
| 1,155,767 | Strohl | Oct. 5, 1915 |
| 1,441,972 | Doherty | Jan. 9, 1923 |
| 1,467,122 | Snell | Sept. 4, 1923 |
| 1,578,760 | Replogle | Mar. 30, 1926 |
| 1,667,351 | Levitt | Apr. 24, 1928 |
| 1,383,429 | Russell | July 5, 1929 |
| 2,263,690 | Bradley | Nov. 25, 1941 |
| 2,416,195 | Mitchell | Feb. 18, 1947 |